United States Patent

Hirota et al.

[11] Patent Number: 5,822,475
[45] Date of Patent: Oct. 13, 1998

[54] OPTICAL BUS AND SIGNAL PROCESSOR

[75] Inventors: Masaki Hirota; Junji Okada; Masao Funada; Takashi Ozawa; Kenji Kawano; Masahiro Taguchi, all of Nakai-machi, Japan

[73] Assignee: Fuji Xerox Co., Ltd., Tokyo, Japan

[21] Appl. No.: 736,481

[22] Filed: Oct. 24, 1996

[30] Foreign Application Priority Data

Dec. 20, 1995 [JP] Japan .................................. 7-332291
Aug. 28, 1996 [JP] Japan .................................. 8-227000

[51] Int. Cl.⁶ ................................................ G02B 6/28
[52] U.S. Cl. .......................... 385/24; 385/46; 385/89; 385/130; 385/131
[58] Field of Search ................................ 385/14, 15, 24, 385/39, 46, 88, 89, 129, 130, 131, 146

[56] References Cited

U.S. PATENT DOCUMENTS

| | | | |
|---|---|---|---|
| 4,358,858 | 11/1982 | Tamura et al. | 359/152 |
| 5,061,027 | 10/1991 | Richard | 385/14 |
| 5,093,890 | 3/1992 | Bregman et al. | 385/146 |
| 5,195,162 | 3/1993 | Sultan et al. | 385/130 |
| 5,218,654 | 6/1993 | Sauter | 385/24 |
| 5,268,973 | 12/1993 | Jenevein | 385/74 |
| 5,408,568 | 4/1995 | Hamilton | 385/129 X |

FOREIGN PATENT DOCUMENTS

B-2-6-22351  3/1994  Japan .
B-2-6-93051  11/1994  Japan .

OTHER PUBLICATIONS

The 9th Science Lecture Meeting of Circuit Packaging Technology, 15C01, Teiji Uchida, pp. 201–202. (No Date).
IEEE Tokyo, No. 33, 1994, "Packing Technology for Optical Interconnects", H. Tomimuro et al., pp. 81–86. [No Month].
O. Wada, Electronics, Apr. 1993, pp. 52–55.
Optronics, No. 6, 1992, "Two–dimensional Optical Buses Using Planar Optics", S. Kawai, pp. 100–106. [No Month].

*Primary Examiner*—John D. Lee
*Attorney, Agent, or Firm*—Oliff & Berridge, PLC

[57] ABSTRACT

To improve resistance to environmental changes and enhance system extensibility, the present invention provides an optical bus for transmitting an optical signal, which has diffusers distributed in a optical transmission layer to diffuse an input signal beam and propagate the diffused signal beam, and a signal processor for carrying out signal processing including transmission and reception of a signal beam using the optical bus.

18 Claims, 7 Drawing Sheets

OPTICAL BUS AND SIGNAL PROCESSOR

BACKGROUND OF THE INVENTION

1. Field of the Invention

This invention relates to an optical bus for transmitting an optical signal and a signal processor for carrying out signal processing including the transmission and reception of data using the optical bus.

2. Description of Related Art

Owing to the development of a very large scale integrated circuit (VLSI), the number of circuit functions of a circuit board (daughter board) used in a data processing system has been greatly increasing. Since the number of signal connections to each circuit board grows as the number of the circuit functions increases, parallel architecture which requires a large number of connection lines and a large number of connectors is being employed in a data bus board (mother board) for connecting circuit boards (daughter boards) by a bus structure. Although the operation speed of a parallel bus has been promoted by enhancing parallelism by increasing the number of layers of a connection line and reducing the line width, the processing speed of a system may be restricted by the operation speed of a parallel bus due to a signal delay caused by capacity between connection lines and connection line resistance. The problem of electromagnetic noise (EMI: Electromagnetic Interference) caused by an increase in the density of parallel bus connection lines greatly restricts improvement on the processing speed of the system.

To solve the above problems and enhance the operation speed of the parallel bus, use of intra-system optical connection technology called "optical interconnection" is now being studied. Various forms of this optical interconnection technology have been proposed according to the configuration of each system as described in "Teiji Uchida, The 9th Science Lecture Meeting of Circuit Packaging Technology, 15C01, pp.201–202", "H. Tomimuro et al., Packaging Technology for Optical Interconnections", IEEE Tokyo No.33 pp.81–86, 1994", and "Osamu Wada, Electronics, April Issue, pp.52–55, 1993".

Out of various forms of the optical interconnection technology proposed so far, Japanese Published Examined Patent Application No. Hei 6-22351 discloses an example in which optical data transmission system using a high-speed, high-sensitivity light emitting/receiving device is applied to a data bus. In this example, there is proposed a serial optical data bus for loop transmission between circuit boards in which a light emitting/receiving device is arranged on both front and rear sides of each circuit board and light emitting/receiving devices on adjacent circuit boards incorporated in a system frame are interconnected spatially optically. In this system, a signal beam transmitted from one circuit board is converted into an electric signal by an adjacent circuit board and further converted into an optical signal by the circuit board, and the converted optical signal is transmitted to the next adjacent circuit board. Thus circuit boards are disposed in series and opto-electric conversion and electro-optic conversion are repeated on each circuit board to transmit the signal to all the circuit boards incorporated in the system frame. Therefore, the signal transmission speed depends on and is restricted by the opto-electric conversion and electro-optic conversion speeds of the light emitting/receiving devices arranged on each circuit board at the same time. Further, since data transmission between circuit boards makes use of optical interconnection of the light emitting/receiving devices arranged on the circuit boards with a free space interposed therebetween, the light emitting/receiving devices disposed on both front and rear surfaces of adjacent circuit boards need to be optically aligned with one another and all the circuit boards need to be optically interconnected. Further, since the light emitting/receiving devices are optically interconnected with a free space interposed therebetween, it is expected that a data transmission failure is caused by the occurrence of interference (cross talk) between adjacent optical data transmission lines. Further, it is also expected that a data transmission failure takes place due to the diffusion of a signal beam caused by the environment within the frame of a system such as dust. Since the circuit boards are arranged in series, when one of the circuit boards is removed, the connection of the circuit boards is disconnected. To compensate for this disconnection, an extra circuit board is necessary. That is, the circuit boards cannot be removed freely and the number of the circuit boards is fixed.

Another data transmission technology between circuit boards making use of a free space is disclosed in Japanese Published Examined Patent Application No. Hei 6-93051. The technology disclosed therein is a system for optically interconnecting circuit boards by means of an optical path which is constructed by a diffraction grating and a reflection element provided on the top surface of a plate having two parallel surfaces and arranged to face a light source. In this system, light emitted from one point can be connected to only one fixed point and all the circuit boards cannot be connected integrally unlike an electric bus. Further, since the system requires a complicated optical system and is difficult to align optical elements, a data transmission failure is expected to occur due to interference (cross talk) between adjacent optical data transmission lines caused by the displacement of the optical elements. Since connection information between circuit boards is determined by the diffraction grating and reflection element arranged on the top surface of the plate, the system involves various problems such as low system extensibility because a circuit board cannot be removed freely.

SUMMARY OF THE INVENTION

In view of the above circumstances, it is an object of the invention to provide an optical bus which has high resistance to environmental changes such as temperature variations and dust and is capable of easily attaching and detaching a circuit board freely in accordance with system extensibility and a signal processor employing the optical bus.

The optical bus of the present invention which attains the above object comprises:

(1-1) a plurality of signal beam input/output portions for carrying out at least one of input and output of signal beams; and (1-2) an optical bus main body forming a common signal path for an optical signal to be transmitted among the plurality of signal beam input/output portions, for diffusing and propagating a signal beam input from one of the plurality of signal beam input/output portions and outputs the signal beam from other signal beam input/output portions.

In the optical bus of the present invention, the above optical bus main body may have optical diffusion portions, provided corresponding to the plurality of signal beam input/output portions, for diffusing signal beams input from the signal beam input/output portions, or a plurality of optical diffusers, distributed therein, for diffusing signal beams propagating therein.

Since the optical bus of the present invention has optical diffusion portions or optical diffusers as described above to diffuse and propagate input signal beams, a signal beam input from a certain signal beam input/output portion is transmitted to any other signal beam input/output portion without fail even when there are temperature variations and the number of circuit boards optically connected to the optical bus in the signal beam input/output portions can be changed to a value equal to or less than the maximum number of the signal beam input/output portions, thereby making it possible to construct a system which is resistant to environmental changes and extensible.

FIG. 1 is a diagram showing typically the basic function verification experimental system of the present invention and FIG. 2 is a diagram showing the results of the experiment.

A 15 cm square, 1.1 mm thick transparent optical sheet bus 100 was prepared and an optical diffusion plate 101 was arranged on the rear surface of the bus to have a light beam 102a from a semiconductor laser 102 incident upon the optical diffusion plate 101 from the front side of the optical sheet bus 100. This incident light beam was received by photodiodes 103a to 103d arranged at measurement points p1 to p4 shown in the figures. As a result, as shown in FIG. 2, received light output voltage proportional to input signal intensity (intensity of the light beam 102a) was obtained at all the measurement points p1 to p4.

In the above optical bus of the present invention, the above optical bus main body preferably has a plurality of laminated optical transmission layers for diffusing and propagating independent signal beams. In this case, the optical bus main body preferably has clad layers having a refractive index smaller than that of the optical transmission layers, each of which is disposed between the respective optical transmission layers. Each of the clad layer may contain an absorber which absorbs a signal beam propagating in a direction traversing the clad layer. More preferably, the above optical bus main body comprises the clad layers having a refractive index smaller than that of the optical transmission layers and contacting with the respective optical transmission layers, each of which is disposed between the respective optical transmission layers, and a shielding layer, sandwiched between the clad layers, for preventing the propagation of a signal beam jumping over the clad layer.

Since the optical bus of the present invention comprises a plurality of signal beam propagation layers, it is possible to transmit a parallel optical signal consisting of a plurality of bits from one of the signal beam input/output portions to another signal input/output portion and transmit an optical signal from one signal beam input/output portion to other signal beam input/output portions and another optical signal independent from the above optical signal from still other signal beam input/output portions to still other signal beam input/output portions simultaneously.

In the present invention, it is not always necessary to provide a plurality of signal beam propagation layers. Only one layer may be provided to transmit and receive a plurality of optical signals by discriminating them by the wavelength of each signal beam or the like.

When the clad layer is provided between the adjacent signal beam propagation layers, it is possible to increase the propagation efficiency of a signal beam. Further, when a plurality of signal beam propagation layers are laminated one upon another, a cross talk between the adjacent signal beam propagation layers can be reduced by providing the clad layers between the respective signal beam propagation layers. Further, when the clad layer contains an absorber, the absorber can absorb a signal beam propagating in a direction traversing the clad layer and the light is further shielded between the adjacent optical transmission layers, thereby further reducing a cross talk between the adjacent optical transmission layers. When the above optical bus main body comprises a shielding layer sandwiched between the clad layers, a cross talk can be further reduced.

The signal processor of the present invention employing the above optical bus comprises:

(2-1) a substrate;

(2-2) a plurality of circuit boards, each having mounted thereon at least one of a combination of a signal beam output terminal for outputting a signal beam and a circuit for generating a signal to be carried out on the signal beam output from the signal beam output terminal and a combination of a signal beam input terminal for inputting a signal beam and a circuit for processing a signal based on a signal carried by the signal beam input from the signal beam input terminal;

(2-3) an optical bus, fixed on the substrate, having a plurality of signal beam input/output portions optically connected to the signal beam output terminals and the signal beam input terminals mounted on the above circuit boards, and forming a common signal path for an optical signal to be transmitted among the plurality of signal beam input/output portions, for diffusing a signal beam input from one of the plurality of signal beam input/output portions and propagating the signal beam to other signal beam input/output portions; and (2-4) a plurality of board fixing portions for fixing the circuit boards to the above substrate in such a manner that the signal beam output terminals and the signal beam input terminals mounted on the circuit boards are connected to the optical bus at the signal beam input/output portions.

The signal processor of the present invention employs the optical bus of the present invention as described above and allows for high-speed communication of an optical signal. The present invention can be constituted such that, when the circuit board is fixed to the respective board fixing portion, the signal beam output terminals and the signal beam input terminals mounted on the circuit board are connected to the optical bus, thereby eliminating the need for fine positional alignment. This is detailed in the Description of the Preferred Embodiments hereinafter.

In the above signal processor of the present invention, the above board fixing portion preferably comprises a board connector for inputting and outputting an electric signal between electronic circuits mounted on the circuit board fixed to the board fixing portion. When the board fixing portion comprises the board connector, the board connector can be used to align (optical connection) the optical bus with the signal beam input terminal and signal beam output terminal on the circuit board and input and output an electric signal.

In the above signal processor of the present invention, the above signal beam output terminal and signal beam input terminal may be a light emitting element for emitting a signal beam and a light receiving element for receiving a signal beam disposed at the positions of the signal beam output terminal and signal beam input terminal, respectively. Or the above signal beam output terminal and signal beam input terminal may be the signal beam output terminal and signal beam input terminal of an optical waveguide for propagating a signal beam, respectively.

In the signal processor of the present invention, the above optical bus comprises a plurality of laminated optical transmission layers and clad layers between the respective optical transmission layers. Preferably, the clad layer contains an absorber for absorbing a signal beam propagating in a direction traversing the clad layer. This constitution can increase the propagation efficiency of a signal beam and reduce a cross talk between the respective signal beam propagation layers.

According to a preferred embodiment of the present invention, the above optical bus comprises a plurality of laminated optical transmission layers, clad layers having a refractive index smaller than that of the optical transmission layers and contacting with the respective optical transmission layers, each of which is disposed between the respective optical transmission layers, and a shielding layer, sandwiched between the clad layers, for preventing the propagation of a signal beam jumping over the clad layer.

BRIEF DESCRIPTION OF THE DRAWINGS

The above and other objects and advantages of the invention will become clear by the following description of preferred embodiments of the present invention with reference to the accompanying drawings, wherein.

DESCRIPTION OF PREFERRED EMBODIMENTS

Preferred embodiments of the present invention will be described hereinunder.

Figure 3:
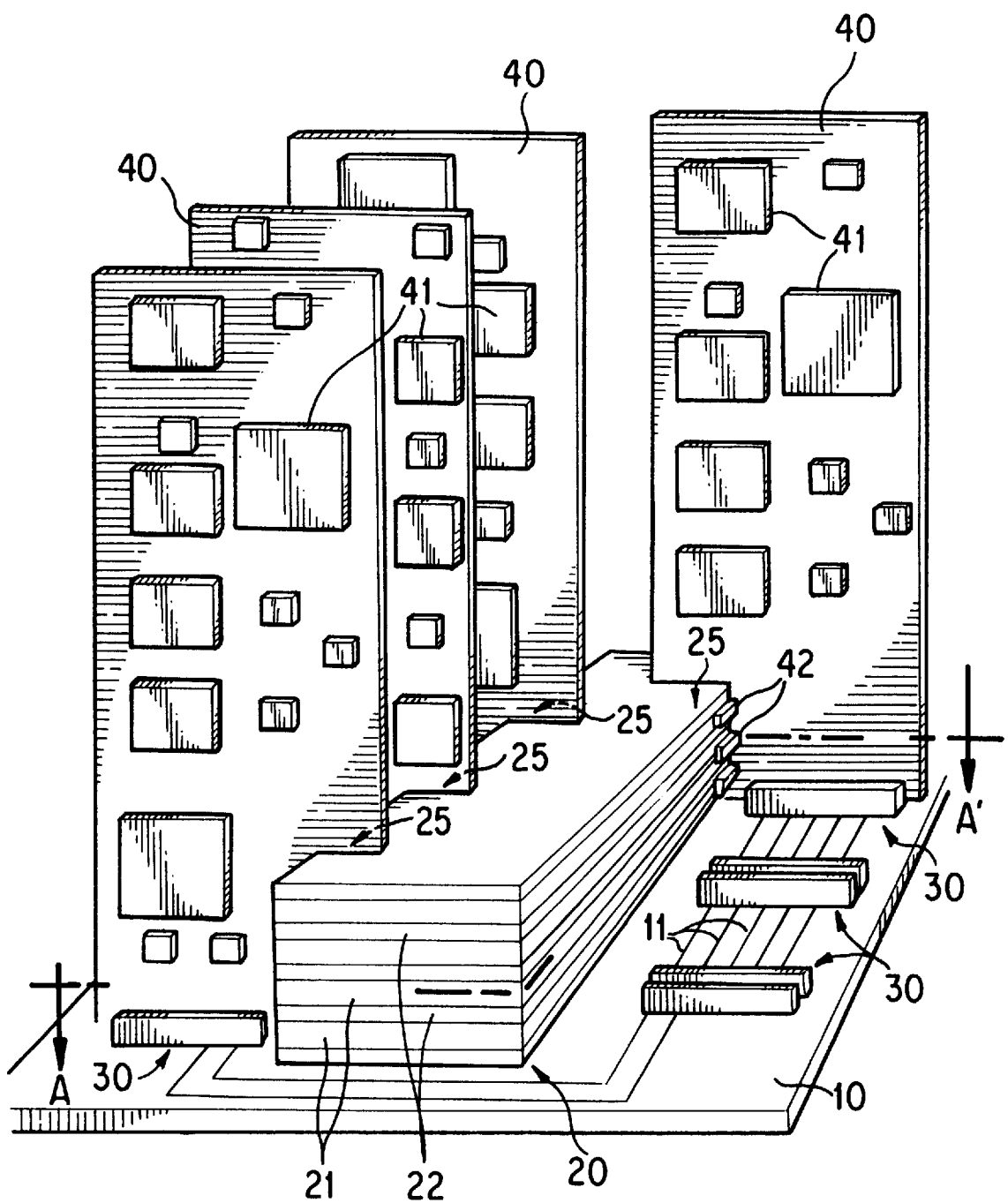
FIG. 3 is a schematic structural diagram of a signal processor according to an embodiment of the present invention, which comprises an optical data sheet bus according to an embodiment of the present invention and a plurality of circuit boards optically connected to the optical data sheet bus.

FIG. 3 is a schematic structural diagram of a signal processor according to an embodiment of the present invention, which comprises a optical data sheet bus which is an embodiment of the optical bus of the present invention and a plurality of circuit boards optically interconnected by the optical data sheet bus.

The optical data sheet bus 20 which is formed by laminating optical transmission layers 21 and clad layers 22 alternately one upon another is fixed on a base substrate 10 which is an example of the substrate of the present invention. Board connectors 30, . . . , 30 are fixed on the base substrate 10 and circuit boards 40, . . . , 40 are detachably set in the board connectors 30, . . . , 30.

A power line and electric wires 11 for transmitting an electric signal are provided on the base substrate 10 and the electric wires 11 are electrically connected to electronic circuits 41 on the circuit boards 40, . . . , 40 set in the board connectors 30, . . . , 30.

Each of the the circuit boards 40, . . . , 40 comprises light emitting/receiving devices 42, . . . , 42, each consisting of a pair of light emitting/light receiving elements. When the circuit board 40 is set in the board connector 30, the light emitting/receiving devices 42, . . . , 42 are optically connected to the optical bus 20 and arranged to face the optical transmission layers 21 of the respective signal input/output portions of the optical bus 20 so that a signal beam output from a light emitting element of the light emitting/receiving device 42 is input into the optical transmission layer 21 of the optical bus 20, diffused within the optical transmission layer 21, transmitted to the signal beam input/output portion 25 which faces the light emitting/receiving device 42 of another circuit board 40, and received by a light receiving element of the light emitting/receiving device 42 optically connected to the signal beam input/output portion 25.

A description is subsequently given of another embodiment of the present invention.

Figure 4:
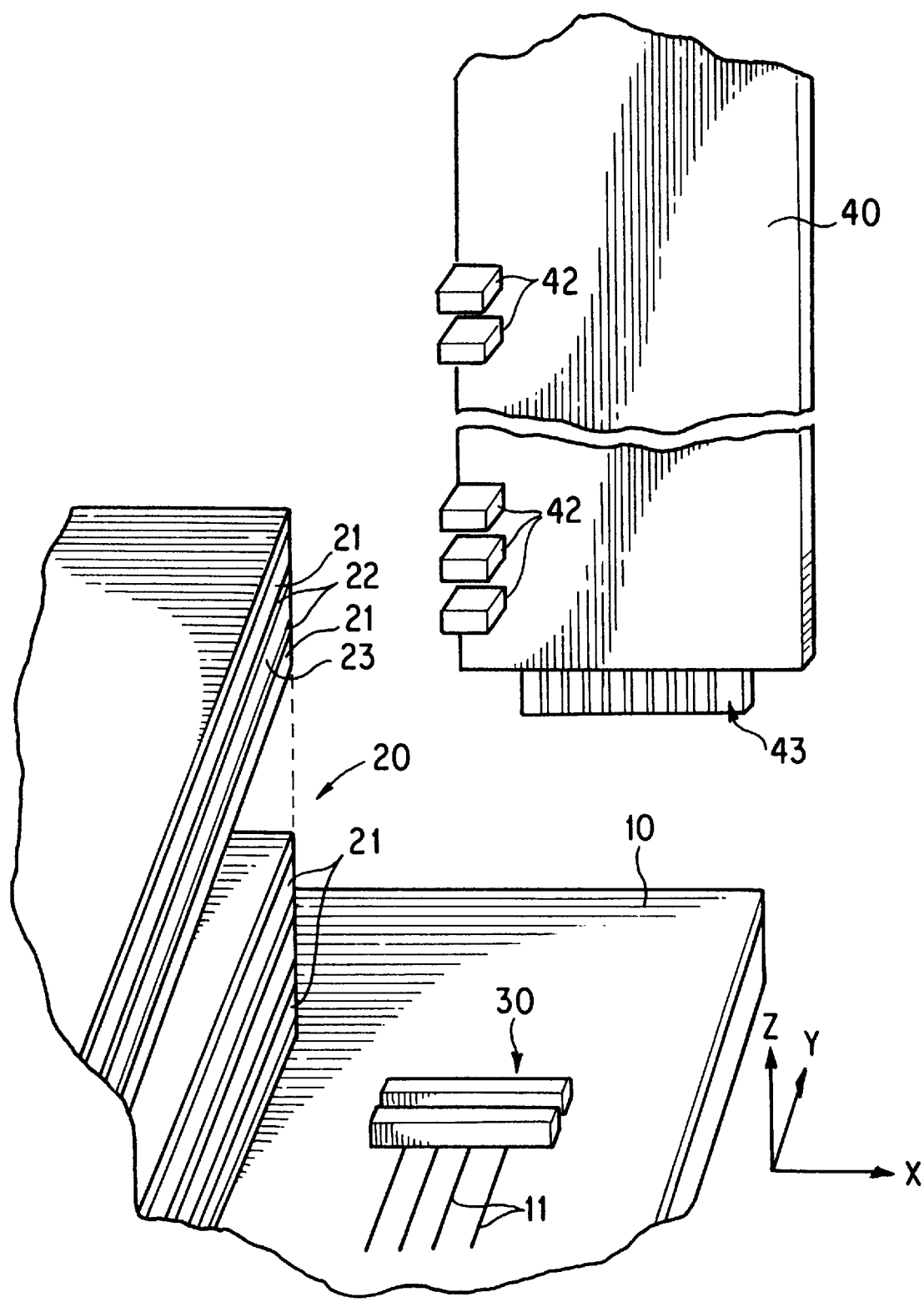
FIG. 4 is a partially enlarged view of the signal processor shown in FIG. 3.

FIG. 4 is a partially enlarged view of the signal processor shown in FIG. 3. In FIG. 4, the number of layers of the optical data bus is generalized and a shielding layer is added.

This optical data bus 20 is fixed on the base substrate 10 and has a multi-layer laminate structure as shown in the figure which is formed by optical transmission layers 21, clad layers 22 formed to sandwich the respective optical transmission layer 21 in a vertical direction and a shielding layer 23 sandwiched between the clad layers 22.

The optical transmission layer 21 is a layer for transmitting a signal beam. In this embodiment, a 0.5 mm thick polymethyl methacrylate (PMMA) layer having high transmittance is used.

A material having a refractive index lower than that of an optical transmission path 21 is selected for the clad layer 22. In this instance, since PMMA is used for the optical transmission path 21, a fluorine-containing polymer is suitably employed for the clad layer 22. In this embodiment, to prevent a signal beam from jumping over the clad layer 22 to be input into the adjacent optical transmission path 21, a shielding layer 23 for absorbing light is provided between the clad layers 22. The shielding layer 23 is formed by dispersing a carbon black inorganic pigment into a clad layer forming material. A black pigment mixed with a fine particle organic pigment may be dispersed in place of the carbon black inorganic pigment. A clad layer forming material colored by a black dye may be used to form the shielding layer 23. In this embodiment, the thickness of each of the two clad layers 22 sandwiching the shielding layer 23 is the same as that of the optical transmission path 21, that is, 0.5 mm. These sheet materials are prepared, piled up one upon another and contact bonded together to construct a laminate-structure optical bus shown in the figure.

Meanwhile, the circuit board 40 has electronic circuits 41 (see FIG. 3) such as a VLSI chip mounted thereon, a plurality of light emitting/receiving devices 42 arranged at a side end portion thereof at the same pitch as that of the optical transmission paths 21 in the direction of the thickness of the optical data bus 20 as shown in FIG. 4, and an electric signal input/output terminal 43 disposed at a lower end portion thereof.

When the electric signal input/output terminal 43 of the circuit board 40 is connected to the board connector 30 on the base substrate 10, the y and z directions shown in the figure are defined and when the light emitting/receiving devices 42 on the circuit board 40 are contacted to the optical data bus 20, the x direction shown in the figure is defined. At the same time, the light emitting/receiving devices 42 and the optical data bus 20 are optically interconnected.

In this embodiment, the electrical connection between the circuit board 40 and the electric wires 11 on the base substrate 10 and the optical connection between the circuit board 40 and the optical data bus 20 are completed simply by setting the circuit board 40 in the board connector 30 properly.

A description is subsequently given of still another embodiment of the present invention.

Figure 5:
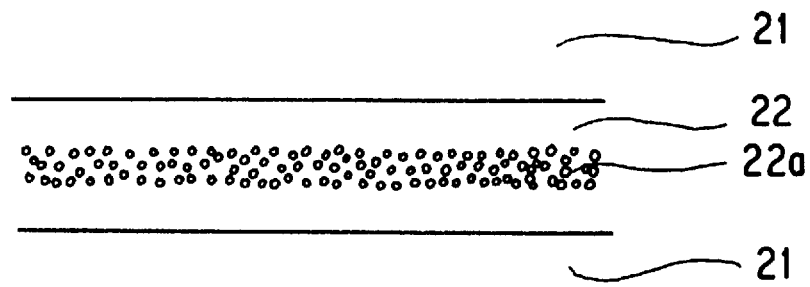
FIG. 5 is a partially enlarged view of the optical data bus of the signal processor shown in FIG. 3.

FIG. 5 is a partially enlarged view of the optical data bus of the signal processor shown in FIG. 3.

This optical data bus 20 has a plurality of clad layers 22 having a refractive index lower than that of the optical transmission layer 21, each of which is laminated between the adjacent optical transmission layers 21 and 21 as shown in the figure. The clad layer 22 contains an absorber 22a for absorbing a signal beam propagating in a direction traversing the clad layer 22 to prevent the signal beam from leaking into the adjacent optical transmission path 21 at a center portion thereof in the thickness direction. As the absorber 22a is used a carbon black inorganic pigment. In this embodiment, the thickness of the clad layer 22 containing the absorber 22a is 0.5 mm, the same as that of the optical transmission path 21. As the absorber 22a may be used a black pigment mixed with a fine particle organic pigment, besides the carbon black inorganic pigment. A center portion in the thickness direction of the clad layer 22 may be colored by a black dye.

Figure 6:
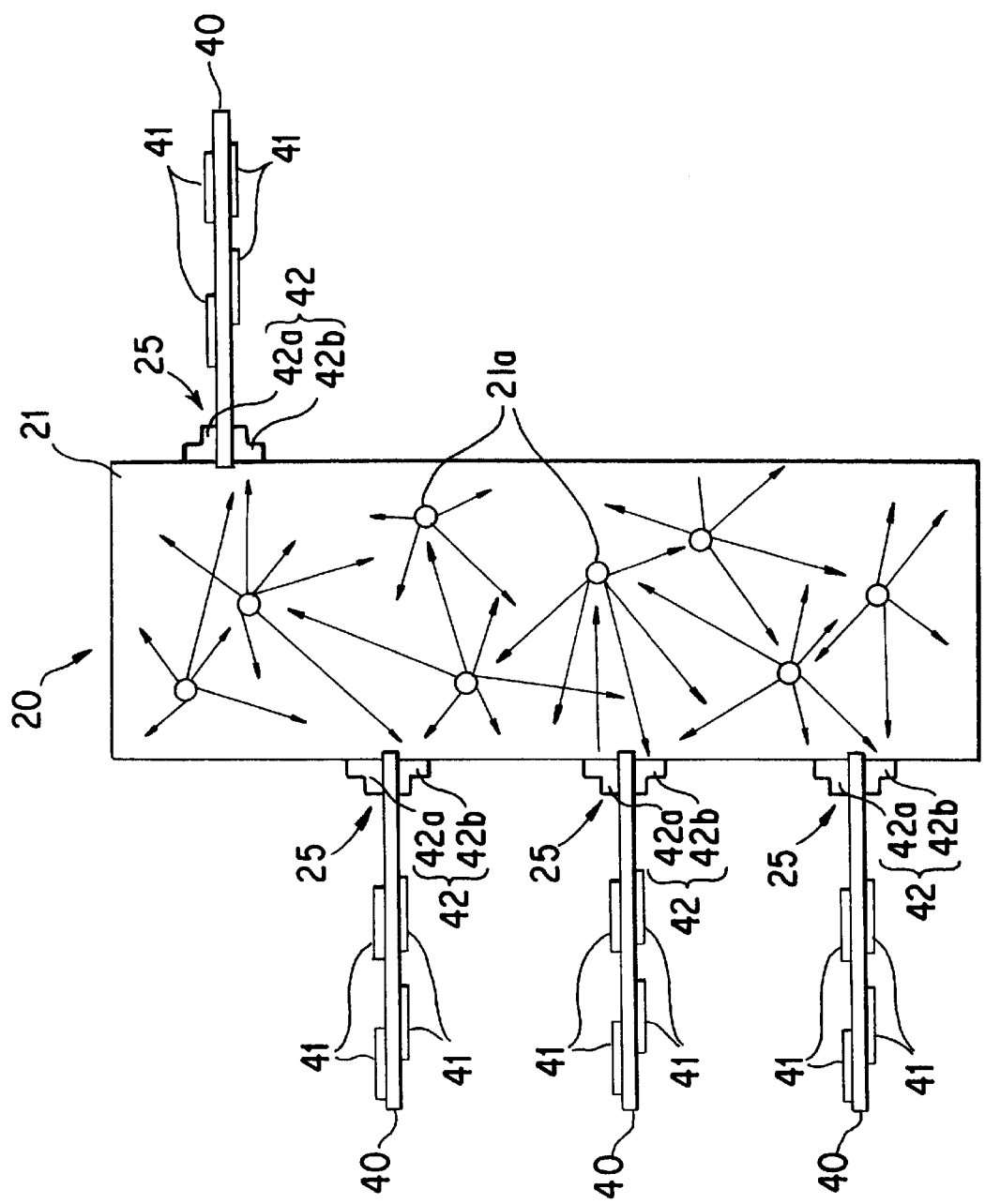
FIG. 6 is a sectional view of the optical data sheet bus shown in FIG. 3 in a direction A-A'.

FIG. 6 is a sectional view in a direction A-A' of the optical data sheet bus shown in FIG. 3.

The light emitting/receiving device 42 which consists of a pair of a laser diode 42a for emitting red visible light having a wavelength of 650 nm and a photodiode 42b which is sensitive to red visible light having a wavelength of 650 nm is arranged on each circuit board 40 in contact with the signal beam input/output portion 25 on the side surface of the optical transmission layer 21 of the optical data bus 20 as described above.

Pulse light carrying a signal is output from the laser diode 42a of the light transmitting/receiving device 42 on the circuit board 40 and is input into the optical transmission layer 21 of the optical data bus 20. This input light propagates through polymethyl methacrylate (PMMA) constituting the optical transmission layer 21, is scattered repeatedly by optical diffusers 21a made of polystyrene (PS) distributed in the polymethyl methacrylate (PMMA) to be diffused all over the sheet of the optical transmission layer 21, and detected by the photodiode 42b at a side end portion of another circuit board 40, . . . , 40 disposed on an end surface of the optical transmission layer 21. In this way, a signal transmitted from one circuit board 40 is transmitted to other circuit boards 40, . . . , 40. A signal beam indicative of an address and a signal beam indicative of data are input into the same optical transmission layer 21 sequentially from the laser diode 42a at a side end portion of the circuit board 40. The receiver of data is specified by the first address signal beam and only the specified circuit board 40 receives the following data signal beam. The transmission and reception of the signal beam are carried out in each of the laminated optical transmission layers 21 simultaneously. In this respect, the timing for transmitting and receiving a signal beam through each of the optical transmission layers 21 is synchronized with a clock signal beam given to one of the plurality of laminated optical transmission layers 21 to specify a signal beam transmitted and received through each of the optical transmission layers 21 as a parallel signal. In this embodiment, the data bus width is set to be equivalent to 32 bits and each of the laminated optical transmission layers 21 is set to be equivalent to 1 bit. Therefore, the specification of an address and the transmission and reception of data are carried out through 32 optical transmission layers 21. When the bus width is widened to a 64-bit data bus width, for example, 64 optical transmission layers 21 may be provided. However, such constitutions are also possible that each of the laminated optical transmission layers 21 is set to be equivalent to 2 bits or more and that two or more of the laminated optical transmission layers 21 are set to be equivalent to 1 bit.

Although polymethyl methacrylate (PMMA) is used as the optical transmission layer 21 in the above embodiments, plastic materials having the same optical characteristics such as polystyrene (PS) and polycarbonate (PC) may be used. Even when polystyrene (PS) or polycarbonate (PC) is used as the optical transmission path 21, a fluorine-containing polymer can be used as the clad layer 22. As the material of the optical diffusers 21a distributed in the optical transmission layer 21 to provide an optical diffusion function, a plastic material having a different refractive index from that of an optical transmission portion of the optical transmission layer 21 can achieve the same function.

Although the thickness of the clad layer including the shielding layer and the thickness of the optical transmission layer are both set to 0.5 mm in the above-described embodiments, they may be smaller or larger if they do not impair the optical characteristics of the layers. By forming thin layers, an optical data bus having an extremely large bus width with a small space can be constructed and hence, the data transmission rate can be greatly improved.

Although a plastic material is used as the optical transmission layer 21 and the clad layer 22 in the above embodiments, a quartz glass material can be used instead. When a quartz glass material is used, it is preferred that a refractive index adjusting material such as $P_2O_5$, $Al_2O_3$ or $B_2O_3$ is used to prepare sheets whose refractive indices are controlled to specific values and these sheets having a great difference in refractive index are combined.

Although each single-layer sheet such as the optical transmission layer 21 and the clad layer 22 is prepared in advance and a laminate structure is formed by contact bonding of these sheets in the above embodiments, a desired laminate structure can be continuously formed in a vacuum film forming apparatus by a chemical vapor deposition method, electron beam deposition method, plasma polymerization method or the like. Alternatively, a desired laminate structure can be formed by a spin coating method or roll coating method using materials having the above constituent substances in each solvent.

Figure 1:
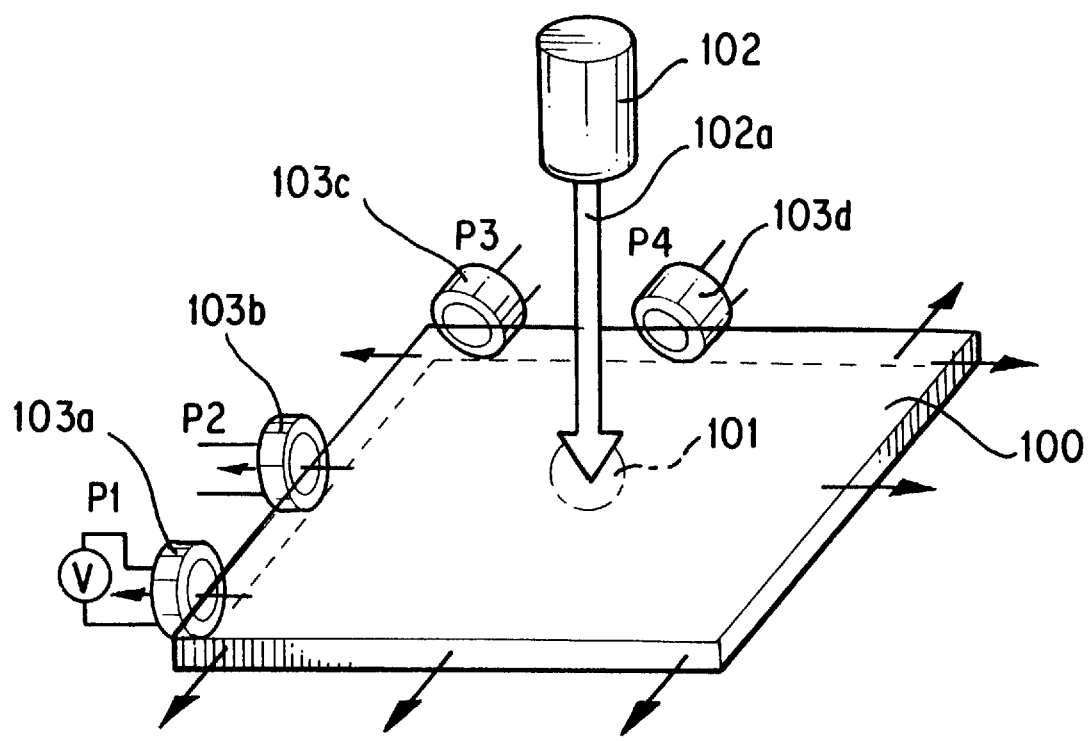
FIG. 1 is a diagram showing typically the basic function verification experimental system of the present invention.
Figure 2:
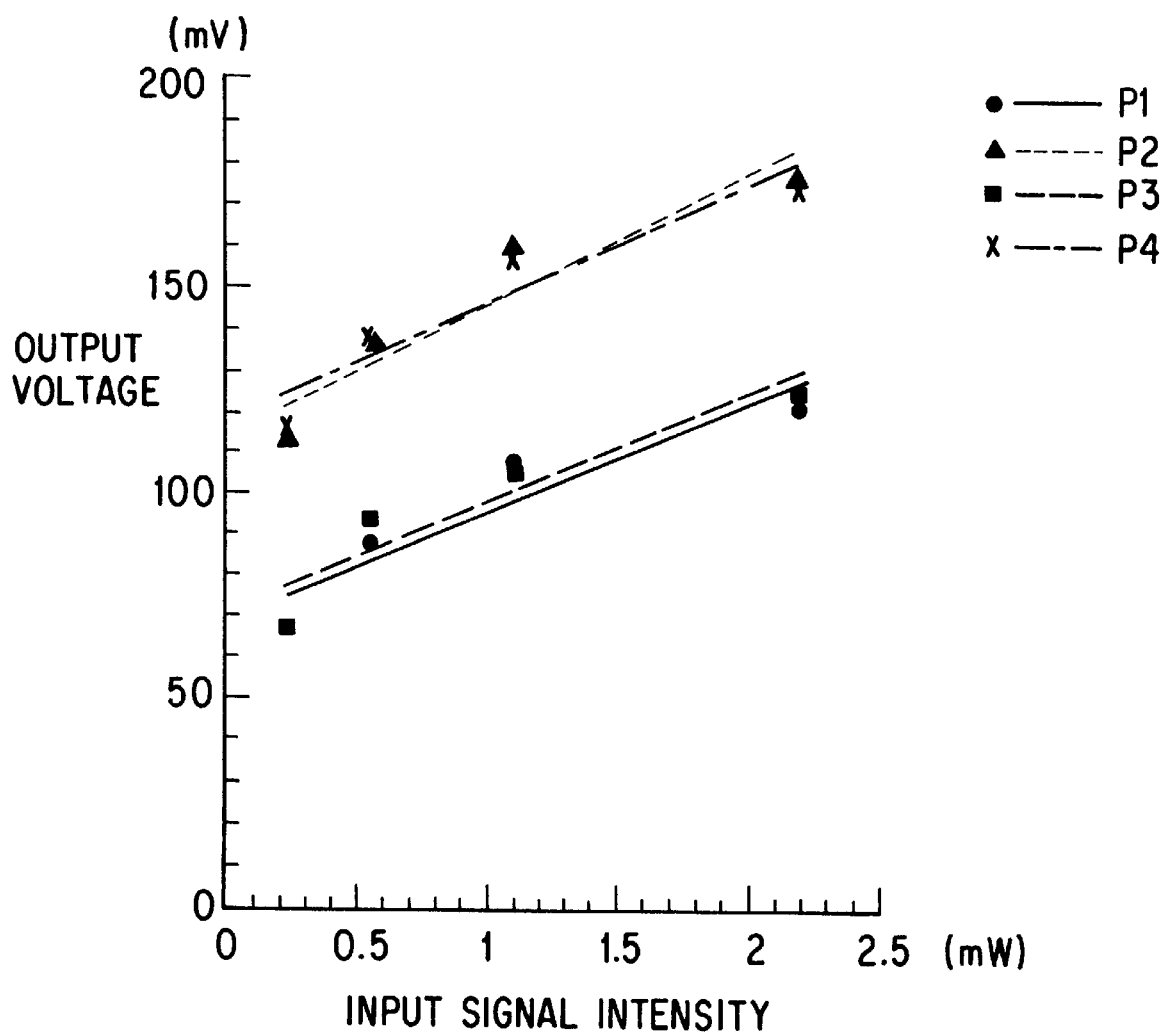
FIG. 2 is a diagram showing the results of the basic function verification experiment of the present invention.

In the above embodiments, an optical transmission sheet layer 21 in which polystyrene (PS) having a different refractive index from that of polymethyl methacrylate (PMMA) is distributed in the polymethyl methacrylate (PMMA) optical transmission path material is used to provide a diffusion function to the polymethyl methacrylate (PMMA) optical transmission layer material. In place of the optical diffusers 21a distributed in the optical transmission layer 21, diffusible optical elements such as optical diffusible lenses may be provided at an input portion of the laser diode 42a, or an optical diffusion plate for reflecting and diffusing light may be arranged at a position where a light beam from the laser diode 42a goes straight through the optical transmission path 21 to the opposite side of the optical transmission path 21 as shown in FIG. 1. The optical diffusible lens and optical diffusion plate are considered as examples of an optical diffusion portion used in the present invention.

Further, in the above embodiments, the light transmitting/receiving device 42 (laser diode 42a and photodiode 42b) on the circuit board 40 is optically connected to the optical data bus 20 directly. An optical waveguide may be formed on the circuit board 40 and may have a light emitting element or light receiving element at an end thereof.

Figure 7:
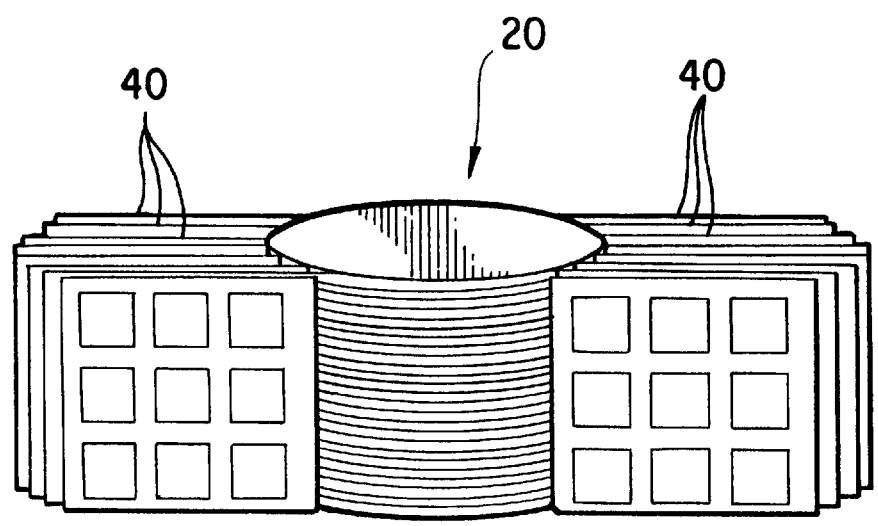
FIG. 7 is a schematic structural diagram of a signal processor according to another embodiment of the present invention.
Figure 8:
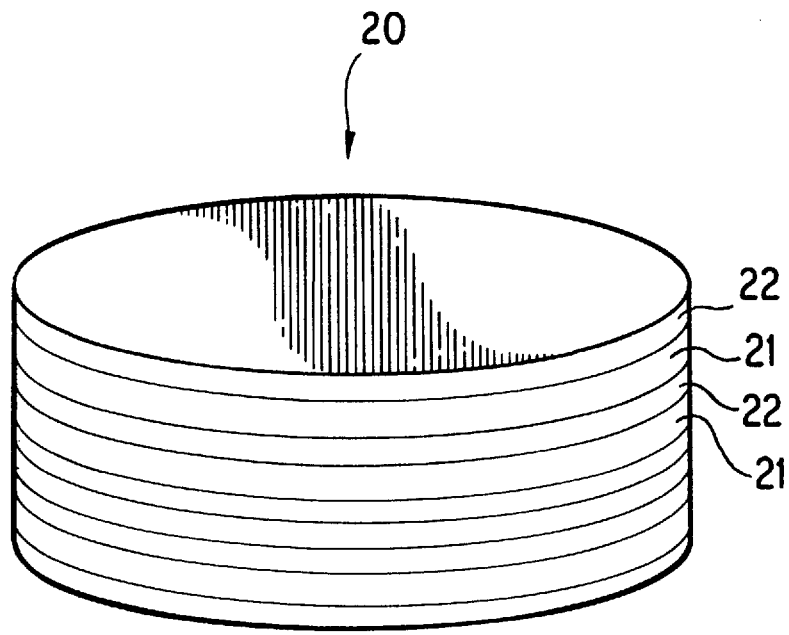
FIG. 8 is a diagram showing an example of an optical data bus employed in the signal processor shown in FIG. 7.
Figure 9:
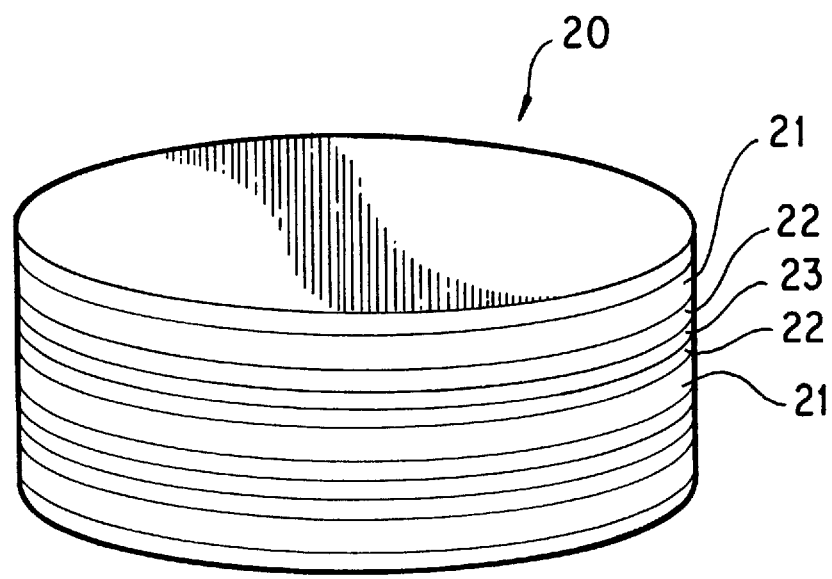
FIG. 9 is a diagram showing another example of an optical data bus employed in the signal processor shown in FIG. 7.

FIG. 7 is a schematic structural diagram of a signal processor according to another embodiment of the present invention, and FIG. 8 and FIG. 9 are diagrams showing examples of an optical data bus used in the signal processor shown in FIG. 7.

In the signal processor shown in FIG. 7, a cylindrical optical data bus 20 is arranged at the center, and circuit boards 40 are arranged around the optical data bus 20. The cylindrical optical data bus 20, as shown in FIG. 8, is structured such that optical transmission layers 21 and clad layers 22 are laminated alternately or a shielding layer 23 is further disposed between the respective clad layers 22 as shown in FIG. 9 to further reduce a cross talk between the optical transmission layers 21.

In this way, the shape of the optical data bus 20 and the shape of the whole signal processor are not limited to specific ones.

As described on the foregoing pages, according to the present invention, since a signal beam is input into the optical bus, and diffused and propagated within the optical bus, the optical bus is resistant to environmental changes and does not make electromagnetic noise unlike a bus for transmitting electric signals.

According to the present invention, a signal beam output from a certain circuit board can be transmitted to all the other circuit boards through the optical bus simultaneously.

Further, according to the present invention, a circuit board can be added or removed freely for system extension and a special short-circuit connector does not need to be used in an empty slot in this case. Therefore, a extensible system can be constructed.

What is claimed is:

1. An optical bus comprising:
   a plurality of signal beam input/output portions; and
   an optical bus main body forming a common signal path for an optical signal to be transmitted among the plurality of signal beam input/output portions, including at least one diffusion portion.

2. The optical bus of claim 1, wherein the optical bus main body has optical diffusion portions, provided corresponding to the respective signal beam input/output portions, for diffusing the signal beams from the signal beam input/output portions.

3. An optical bus comprising:
   a plurality of signal beam input/output portions; and
   an optical bus main body forming a common signal path for an optical signal to be transmitted among the plurality of signal beam input/output portions, including a plurality of optical diffusers.

4. An optical bus comprising:
   a plurality of signal beam input/output portions; and
   an optical bus main body forming a common signal path for an optical signal to be transmitted among the plurality of signal beam input/output portions, including a plurality of laminated optical transmission layers.

5. The optical bus of claim 4, wherein the optical bus main body has clad layers having a refractive index smaller than that of the optical transmission layers, each disposed between the respective optical transmission layers.

6. The optical bus of claim 5, wherein each clad layer contains an absorber for absorbing a signal beam propagating in a direction traversing the clad layer.

7. The optical bus of claim 4, wherein the optical bus main body comprises clad layers having a refractive index smaller than that of the optical transmission layers and contacting with the respective optical transmission layers, each of which is disposed between the respective optical transmission layers, and shielding layers, sandwiched between the clad layers, for preventing the propagation of a signal beam jumping over a clad layer.

8. A signal processor comprising:
   a substrate;
   a plurality of circuit boards having mounted thereon at least one of a combination of a signal beam output terminal for outputting a signal beam and a circuit for generating a signal to be carried out on the signal beam output from the signal beam output terminal and a combination of a signal beam input terminal for inputting a signal beam and a circuit for carrying out signal processing based on a signal carried out by the signal beam input from the signal beam input terminal;
   an optical bus, fixed on the substrate, having a plurality of signal beam input/output portions optically connected to the signal beam output terminals and the signal beam input terminals mounted on the circuit boards, and forming a common signal path for an optical signal to be transmitted among the plurality of signal beam input/output portions, for diffusing a signal beam input from one of the plurality of signal beam input/output portions and propagating the signal beam to other signal beam input/output portions; and
   a plurality of board fixing portions for fixing the circuit boards to the above substrate in such a manner that the signal beam output terminals and the signal beam input terminals mounted on the circuit boards are connected to the optical bus at the signal beam input/output portions.

9. The signal processor of claim 8, wherein each of the board fixing portions comprises a board connector for inputting and outputting an electric signal between electronic circuits mounted on the circuit board to be fixed to the board fixing portion.

10. The signal processor of claim 8, wherein the signal beam output terminal and the signal beam input terminal are a light emitting element for emitting a signal beam and a light receiving element for receiving a signal beam disposed at the positions of the signal beam output terminal and the signal beam input terminal, respectively.

11. The signal processor of claim 8, wherein the signal beam output terminal and the signal beam input terminal are the signal beam output terminal and signal beam input terminal of an optical waveguide for propagating signal beams, respectively.

12. The signal processor of claim 8, wherein the optical bus comprises a plurality of laminated optical transmission layers and clad layers having a refractive index smaller than that of the optical transmission layers, each disposed between the respective optical transmission layers, and each of the clad layers contains an absorber for absorbing a signal beam propagating in a direction traversing the clad layer.

13. The signal processor of claim 8, wherein the optical bus comprises a plurality of laminated optical transmission layers, clad layers having a refractive index smaller than that of the optical transmission layers and contacting with the respective optical transmission layers, each disposed between the respective optical transmission layers, and a shielding layer, sandwiched between the clad layers, for preventing the propagation of a signal beam jumping over a clad layer.

14. An optical bus comprising:

a plurality of signal beam input/output portions; and an optical bus main body forming a common signal path for an optical signal to be transmitted among the plurality of signal beam input/output portions, the optical bus main body including a plurality of optical diffusers dispersed therein.

15. The optical bus of claim 14, wherein the optical bus main body has a plurality of laminated optical transmission layers.

16. The optical bus of claim 15, wherein the optical bus main body has clad layers having a refractive index smaller than that of the optical transmission layers, each of the clad layers disposed between the respective optical transmission layers.

17. The optical bus of claim 16, wherein each of the clad layers contains an absorber.

18. The optical bus of claim 15, wherein the optical bus main body comprises clad layers having a refractive index smaller than that of the optical transmission layers and contacting with the respective optical transmission layers, each of the clad layers being disposed between the respective optical transmission layers, and shielding layers sandwiched between the clad layers.

* * * * *